United States Patent

[11] 3,569,793

[72] Inventor Balthasar H. Pinckaers Edina, Minn.
[21] Appl. No. 834,426
[22] Filed June 18, 1969
[45] Patented Mar. 9, 1971
[73] Assignee Honeywell Inc. Minneapolis, Minn.

[54] FAIL SAFE CIRCUIT WHICH DETECTS THE PRESENCE OR ABSENCE OF A CYCLIC SIGNAL OF REVERSIBLE POLARITY
10 Claims, 1 Drawing Fig.

[52] U.S. Cl. .......... 317/123, 317/148, 317/148.5, 317/151, 317/157
[51] Int. Cl. .......... H01h 47/00
[50] Field of Search .......... 317/147, 29, 151, 155.5; 324/161, 78 (Q), 78 (S); 340/409; 321/2

[56] References Cited

UNITED STATES PATENTS

| | | | |
|---|---|---|---|
| 2,807,011 | 9/1957 | Rowell | 340/409 |
| 3,209,212 | 9/1965 | Billings | 317/147 |
| 3,244,959 | 4/1966 | Thompson et al. | 324/78 |
| 3,288,195 | 11/1966 | Thomson | 317/155.5 |

OTHER REFERENCES

Fitchen, Franklin C., Transistor Circuit Analysis and Design, D. Van Nostrand Co., Inc., April 1966, Princeton, New Jersey Pages 194—195.

*Primary Examiner*—Milton O. Hirshfield
*Assistant Examiner*—Ulysses Weldon
*Attorneys*—Lamont B. Koontz and Alfred N. Feldman

ABSTRACT: Two opposite conductivity type transistors are controlled by a cyclic signal of reversible polarity. The first transistor controls a first series circuit to charge a first capacitor by means of a current which flows in a first direction through a saturable reactor. The second transistor controls a second series circuit to discharge the first capacitor into a second capacitor by means of a current which flows in the opposite direction through the saturable reactor. The reactor limits the upper frequency of cyclic signal which will produce a sufficient or usable charge on the second capacitor.

PATENTED MAR 9 1971
3,569,793
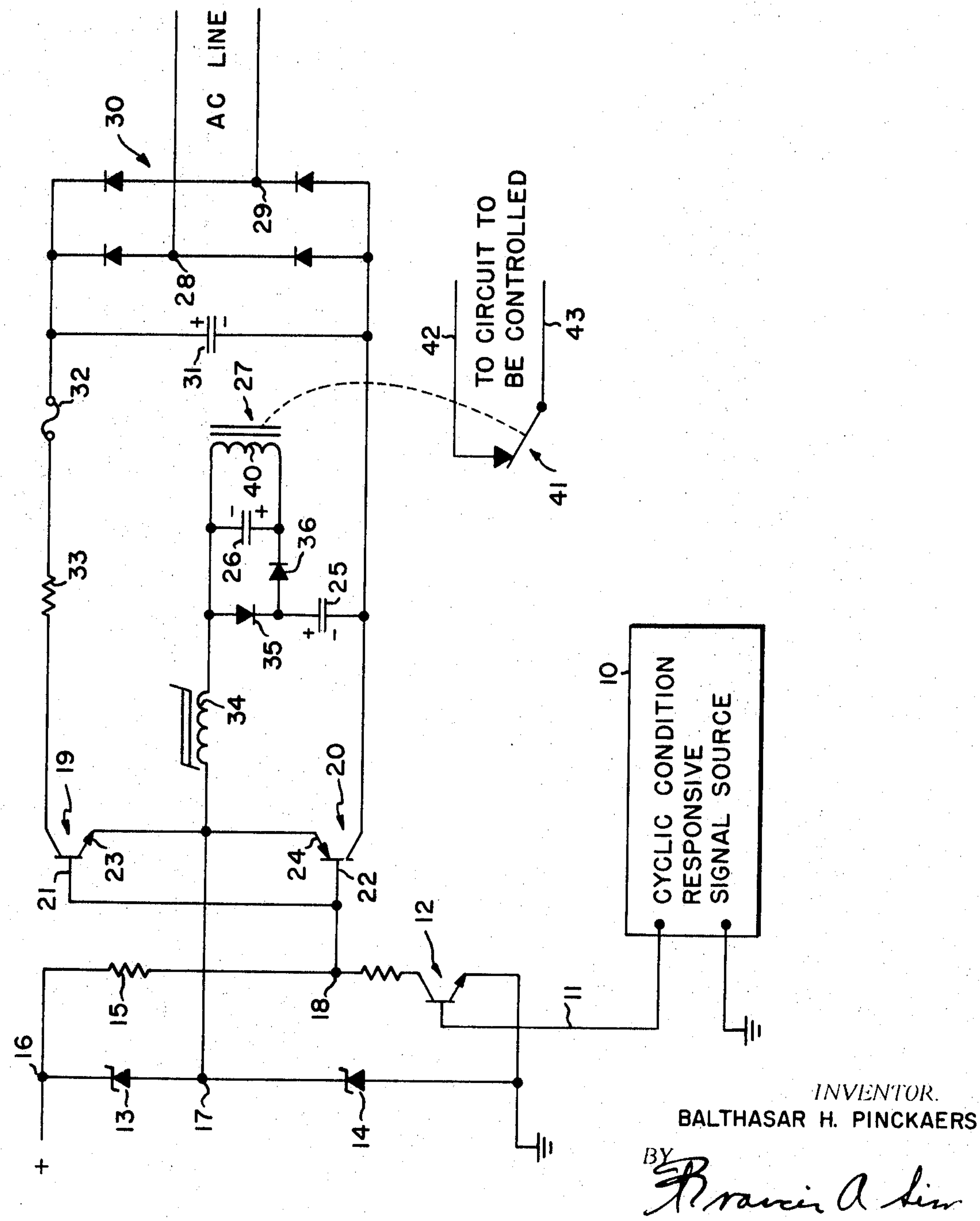
INVENTOR.
BALTHASAR H. PINCKAERS
BY Francis A. Sirr
ATTORNEY.

FAIL SAFE CIRCUIT WHICH DETECTS THE PRESENCE OR ABSENCE OF A CYCLIC SIGNAL OF REVERSIBLE POLARITY

BACKGROUND OF THE INVENTION

Prior art fail safe circuits detect a cyclic input signal and utilize a circuit which alternately charges a capacitor and then discharges that capacitor into output means, for example, a second capacitor and a parallel relay winding, to maintain the output means continuously energized so long as the circuit continuously moves between two states of operation as a result of the cyclic input signal. U.S. Pat. Nos. 2,807,011 and 3,288,195 are examples of such prior art.

SUMMARY OF THE INVENTION

The invention is directed to a fail safe circuit which responds only to a cyclic input signal of reversible polarity. A saturable reactor or inductor is utilized to establish an upper frequency limit and the circuit will not respond to a cyclic input signal whose frequency is above this upper limit.

More specifically, the invention provides a first series circuit including a first transistor which is rendered conductive in response to an input of one polarity, the saturable reactor, a first diode and a first capacitor. The first series circuit charges the first capacitor by means of a current which flows in a first direction through the saturable reactor. A second series circuit includes a second transistor which is rendered conductive in response to an input of the opposite polarity, the saturable reactor, a second diode, a second capacitor and a relay whose winding is connected in parallel with the second capacitor. The second series circuit transfers the charge from the first capacitor to the second capacitor. The frequency of the cyclic signal of reversible polarity must be of a relatively low frequency, as determined by the characteristics of the saturable reactor, since the reactor must saturate in each half cycle of the signal, thus giving the first and second series circuits time to complete the charging of the two capacitors

BRIEF DESCRIPTION OF THE DRAWING

The single FIGURE is a schematic showing of the invention.

DESCRIPTION OF THE PREFERRED EMBODIMENT

Referring to the single FIGURE, a cyclic condition responsive signal source 10 has output conductor 11 connected to the base electrode of transistor 12. Signal source 10 is shown in block diagram form and may, for example, be a flame detector which, in response to the presence of flame, provides at conductor 11 a cyclic signal of relatively low frequency. The characteristics of signal source 10 are such that, in the absence of the condition to be detected, the cyclic signal no longer exists at conductor 11.

Transistor 12 is a portion of a bridge network which includes Zener diodes 13 and 14 and resistor 15. Terminal 16 is connected to the positive terminal of a source of direct current potential. By way of example, terminal 16 may be approximately 11 volts positive.

Output terminals 17 and 18 of the bridge network are connected to the input electrodes of the opposite conductivity type transistors 19 and 20. Specifically, terminal 18 is connected to the base electrodes 21 and 22, and terminal 17 is connected to the emitter electrodes 23 and 24. Transistors 19 and 20 constitute first and second switch means having input means which are sensitive to a first and an opposite polarity.

Considering the circuit as thus far described, the signal on conductor 11 controls transistor 12 to render this transistor conductive when conductor 11 is positive and is rendered nonconductive when this conductor is zero or negative. When transistor 12 is nonconductive, terminal 18 is positive with respect to terminal 17 and transistor 19 is rendered conductive. For a specific embodiment, the circuit parameters were selected to furnish approximately 2 milliamp base drive current to transistors 19 and 20, as these transistors are alternately rendered conductive, as above described.

Transistor 19 is a portion of a first circuit means which is adapted to charge capacitor 25 to the polarity shown, as will be described. Transistor 20 is a portion of a second circuit means which is adapted to discharge capacitor 25 into an output means, including a capacitor 26 and a relay 27, to maintain relay 27 energized, as will be described.

Power input terminals 28 and 29 are adapted to be connected to an alternating current line to energize a full wave rectification bridge 30, the output of the bridge charging capacitor 31 to the polarity indicated. Capacitor 31 constitutes a source of direct current voltage for the above described first circuit means.

Considering this first circuit means, when transistor 19 is conductive, a circuit can be traced from the positive terminal of capacitor 31 through fuse 32, resistor 33, the collector-to-emitter circuit of transistor 19, saturable reactor 34, diode 35, and capacitor 25 to the negative terminal of capacitor 31. Diode 35 serves to shunt capacitor 26 and a second diode 36 and to allow current to flow in a first direction through saturable reactor 34 as capacitor 25 charges. The circuit parameters are chosen such that saturable reactor 34 will pass very little current for a period of time. Thus, saturable reactor 34 establishes an upper limit in the frequency of the signal at terminals 17 and 18 which will result in charging of capacitor 25. For example, a 60 Hertz alternating current may be applied to terminals 28 and 29, in which case reactor 34 is selected so as to pass very little current for a period of 10 milliseconds. In a specific embodiment of the present invention, the circuit parameters were chosen such that the circuit accommodates input frequencies as low as 0.6 Hertz. The saturable reactor, which discriminates very effectively against higher cycling rates was designed such that a frequency of 25 Hertz, or above, resulted in negligible voltage across capacitor 25. The physical design of saturable reactor 34 should be such that it is extremely unlikely that its coil will short, since such a short would allow a higher frequency input at terminals 17 and 18 to cause charging of capacitor 25.

Considering the second circuit means including transistor 20, when this transistor is conductive a circuit can be traced from the upper terminal of capacitor 25 through diode 36, capacitor 26, saturable reactor 34 and the emitter-to-collector circuit of transistor 20 to the lower terminal of capacitor 25. Diode 36 is poled so as to allow capacitor 25 to discharge and to allow capacitor 26 to charge to the polarity indicated.

Since transistors 19 and 20 are of the opposite conductivity type, one of these transistors is always rendered nonconductive when the other transistor is rendered conductive because they receive the same input.

So long as terminals 17 and 18 continue to provide a cyclic signal of reversible polarity, transistors 19 and 20 continuously cycle between conductive and nonconductive states and capacitor 25 is cyclically charged and then discharged into capacitor 26. Relay 27 includes a winding 40 which parallels capacitor 26. This winding is maintained continuously energized, to maintain relay switch 41 continuously closed, so long as transistors 19 and 20 continue to cycle between conductive and nonconductive states at a low frequency which is accepted by saturable reactor 34. Switch 41 is shown connected to out put conductors 42 and 43 as shown as connected to a circuit to be controlled.

Referring again to the first and second circuit means, inductor 34 must receive current flow in opposite directions from each of the first and second circuit means. Furthermore, the inductor, which preferably has a square loop iron must be saturated by each direction of current flow before appreciable current flows in the first and second circuit means. Saturation requires a discrete period of time and this time period limits the upper frequency of cyclic signal of reversible polarity at terminals 17 and 18 which will be accepted to maintain relay 27 continuously energized.

By way of example, if terminals 28 and 29 are connected to a 60 Hertz alternating current source, saturable reactor 34 is selected such that very little current will flow in either the first or second circuit means for an initial period of approximately 10 milliseconds. Therefore, a short time duration, for example, 3 millisecond, turn-on of either transistor 19 or transistor 20, will not cause an appreciable charging of capacitor 25 when transistor 19 is turned on, and will not cause appreciable charging of capacitor 26 when transistor 20 is turned on. Thus, relay 27 is continuously energized only if transistors 19 and 20 are alternately turned on and off at a frequency which is within a certain range. The upper value of this range is selected to be well below 60 Hertz, for the example given.

The cyclic signal of reversible polarity at terminals 17 and 18 need not be symmetrical. For one portion of the cycle one of the transistors 19 and 20 is rendered conductive and for the other portion of the cycle the other transistor is rendered conductive. The transistor which is rendered conductive to the shortest time period is the transistor which limits the ability of the circuit to maintain relay 27 continuously energized. For example, if transistor 19 is rendered conductive for a time period less than 10 milliseconds, then saturable reactor 34 does not saturate and capacitor 25 does not receive an appreciable charge. Thus, even though transistor 20 may be rendered conductive for a length of time substantially greater than 10 milliseconds, capacitor 26 receives only a minimum charge and relay 27 remains deenergized. For the alternate example, transistor 19 is maintained conductive for an appreciable length of time and capacitor 25 receives a substantial charge. However, transistor 20 is rendered conductive for a period of time less than 10 milliseconds, and is ineffective to cause a current to flow through inductor 34. Thus, very little energy is transferred from capacitor 25 to capacitor 26 and relay 27 remains deenergized.

I claim:

1. In a circuit for detecting the presence or absence of a cyclic signal of reversible polarity, the circuit comprising:

a source of direct current voltage;

first circuit means including first switch means having input means responsive to a first polarity, first unidirectional conducting means, and first capacitor means connected in series to said source of direct current, said first unidirectional conducting means being poled to allow charging of said first capacitor means from said source of direct current;

second circuit means including second switch means having input means sensitive to an opposite polarity, output means, and second unidirectional conducting means connected in series to said first capacitor means, said second unidirectional conducting means being poled to allow energization of said output means from said first capacitor means; and means connected to receive the cyclic signal and to render said first and second switch means alternately conductive.

2. The circuit as defined in claim 1 wherein said output means includes second capacitor means which is charged from said first capacitor means.

3. The circuit as defined in claim 2 wherein said first and second switch means are opposite conductivity type transistors whose input electrodes are connected to be controlled by said means connected to receive the cyclic signal and to render said first and second switch means alternately conductive.

4. The circuit as defined in claim 3 wherein said first and second unidirectional conducting means are diodes, said second diode being connected in a series circuit with said second capacitor means, and said series circuit being connected in parallel with said first diode.

5. The circuit as defined in claim 4 wherein said output means includes a relay having a winding connected in parallel with said second capacitor means.

6. The circuit as defined in claim 2 wherein saturable reactor means is connected in said first circuit means and in said second circuit means such that the current which flows in said first circuit means flows in a first direction through said saturable reactor means and the current which flows in said second circuit means flows in the opposite direction through said saturable reactor means.

7. The circuit as defined in claim 6 wherein said source of direct current voltage includes rectification means connected to a source of alternating current of relatively high frequency, wherein the cyclic signal of reversible polarity is of a lower frequency, and wherein the saturation characteristics of said saturable reactor means are such that said saturable reactor means discriminates against a cyclic signal of said relatively high frequency.

8. The circuit as defined in claim 7 wherein said rectification means includes a capacitor whose terminals constitute the terminals of said source of direct current voltage, and including fuse means connecting said capacitor to said first circuit means.

9. The circuit as defined in claim 6 wherein said first and second unidirectional conducting means are diodes, said second diode being connected in a series circuit with said second capacitor means, and said series circuit being connected in parallel with said first diode.

10. The circuit as defined in claim 9 wherein said output means includes a relay having a winding connected in parallel with said second capacitor means.